United States Patent [19]

Isayama et al.

[11] Patent Number: 4,543,403
[45] Date of Patent: Sep. 24, 1985

[54] CURABLE COMPOSITION

[75] Inventors: Katsuhiko Isayama; Toshifumi Hirose; Fumio Kawakubo, all of Kobe, Japan

[73] Assignee: Kanegafuchi Kagaku Kogyo Kabushiki Kaisha, Osaka, Japan

[21] Appl. No.: 587,962

[22] Filed: Mar. 9, 1984

[30] Foreign Application Priority Data

Mar. 15, 1983 [JP] Japan ............................... 58-43848

[51] Int. Cl.⁴ ..................... C08F 26/12; C08F 126/08; C08F 226/08
[52] U.S. Cl. .................................. 526/263; 526/194; 526/271; 526/273; 526/279
[58] Field of Search .............. 526/194, 279, 263, 271, 526/273

[56] References Cited

U.S. PATENT DOCUMENTS 3,324,074  6/1967  McManimie .................... 526/194
3,453,230  7/1969  Plueddemann ................... 526/279
3,775,386  11/1973  Citron ............................ 526/194

Primary Examiner—Joseph L. Schofer
Assistant Examiner—J. M. Reddick
Attorney, Agent, or Firm—Antonelli, Terry & Wands

[57] ABSTRACT

A moisture curable composition comprising an acrylate or methacrylate polymer having a silicon functional group capable of causing crosslinking or chain extension by moisture, at least in molecular ends, and being useful particularly as a sealing material and a pressure sensitive adhesive, said polymer being prepared by polymerizing (a) an alkyl acrylate or methacrylate or a monomer mixture of at least 50% by weight of the alkyl acrylate or methacrylate and other unsaturated compounds copolymerizable therewith and (b) 0 to 20 parts of $\alpha,\beta$-ethylenically unsaturated organic silicon compound in the presence of (c) 0.01 to 20 parts of a radical polymerization initiator having a group of the general formula:

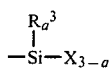

wherein $R^3$ is a monovalent hydrocarbon group having 1 to 6 carbon atoms, X is a hydrolyzable group and "a" is 0, 1 or 2, and (d) 0 to 20 parts of a chain transfer agent selected from the group consisting of a compound of the general formula:

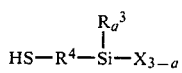

and a compound of the general formula:

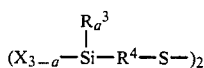

wherein $R^3$, X and "a" are as defined above, and $R^4$ is a bivalent organic group, said parts of (b), (c) and (d) being parts by weight per 100 parts by weight of (a).

12 Claims, No Drawings

CURABLE COMPOSITION

BACKGROUND OF THE INVENTION

The present invention relates to a moisture curable composition which is curable even at ordinary temperature, and more particularly to a moisture curable composition containing as a main component a polymer having a moisture reactive organic silicon group (hereinafter referred to as "silicon functional group") in at least one polymer chain end and capable of providing an elastomeric cured product.

It has been attempted to use a methacrylate or acrylate polymer having a silicon functional group as a sealing material and a pressure sensitive adhesive. As a general process for introducing the silicon functional group into a methacrylate or acrylate polymer, there is mentioned a process in which an acrylate or methacrylate is copolymerized with an unsaturated compound having a silicon functional group such as vinyltrimethoxysilane or γ-methacryloyloxypropyltriethoxysilane. However, the copolymer obtained by this process has the silicon functional groups randomly introduced in the polymer chain. Therefore, in case that the copolymer is a low molecular polymer, the cured product, namely the crosslinked product, has the defect that the elongation is low because the space between the crosslinking points is small. For giving the cured product having a high elongation, it is necessary to make the molecular weight of the produced copolymer large and to decrease the amount of the silicon functional group-containing monomer to be copolymerized so as to increase the space between the crosslinking points. However, the copolymer having a high molecular weight is a high viscous or solid substance, and accordingly when it is used as a moisture curable amorphous sealing material or pressure sensitive adhesive, it must be dissolved in a relatively large amount of an organic solvent and used in the form of a solvent solution. The sealing material of solvent type has the disadvantage that the shrinkage due to evaporation of the solvent occurs or the adhesion property is lowered by the use of the solvent. Also, the pressure sensitive adhesive of solvent type has the disadvantages that a long time is required in drying the adhesive coated onto a substrate such as a film to evaporate the solvent and the use of the solvent may cause a fire or exert a bad influence on the human body.

For eliminating the above problems and obtaining a sealing material or pressure sensitive adhesive having excellent properties, it is desirable to use a copolymer which has a relatively low molecular weight, in other words, which is a substance having a sufficiently low viscosity, and which has functional groups capable of causing crosslinking or chain extension reaction in the copolymer molecular ends as abundantly as possible, namely the so-called telechelic low polymer. Since the molecular weight of the telechelic low polymer is low, the viscosity of the polymer itself is low and the polymer can be used without a solvent or in the form of a solution of high solid content. Also, since the functional groups are present at the polymer chain ends, the space between the crosslinking points is large, thus there can be obtained a cured product having a high elongation and consequently sealing materials and pressure sensitive adhesives having excellent properties.

It is an object of the present invention to provide a telechelic polymer capable of being easily cured and suitable for use in a sealing material and a pressure sensitive adhesive.

A further object of the invention is to provide a moisture curable composition containing an acrylate or methacrylate polymer having a moisture reactive silicon functional groups and capable of providing an elastomeric cured product.

These and other objects of the present invention will become apparent from the description hereinafter.

SUMMARY OF THE INVENTION

In accordance with the present invention, there is provided a curable composition comprising a polymer having an organic silicon group in the chain end prepared by polymerizing (a) a monomer comprising an acrylic or methacrylic acid ester of the general formula (I):

wherein $R^1$ is hydrogen atom or methyl group, and $R^2$ is an alkyl group having 1 to 14 carbon atoms, and (b) 0 to 20 parts of a polymerizable unsaturated organic silicon compound in the presence of (c) 0.01 to 20 parts of a radical polymerization initiator having a group of the general formula (II):

wherein $R^3$ is a monovalent hydrocarbon group having 1 to 6 carbon atoms, X is a hydrolyzable group, and "a" is 0, 1 or 2, and (d) 0 to 20 parts of an organic silicon compound as a chain transfer agent selected from the group consisting of a compound of the general formula (III):

wherein $R^3$, X and "a" are as defined above, and $R^4$ is a bivalent organic group, and a compound of the general formula (IV):

wherein $R^3$, $R^4$, X and "a" are as defined above, said parts of the components (b), (c) and (d) being parts by weight per 100 parts by weight of the component (a).

Silicon functional groups are introduced into the molecular ends of the produced polymer by the use of the above specified initiator (c). The moisture curability of the composition can be increased by the use of the copolymerizable organic silicon compound (b). Also, the use of the chain transfer agent (d) is effective for lowering the molecular weight of the produced polymer as well as introduction of a silicon functional group into the polymer chain end, in other words, for producing a telechelic low polymer. The composition of the present invention containing the above polymer having terminal organic silicon groups as a main component can be cured by moisture to a cured product having a high elongation, and is useful as a moisture curable sealing material or pressure sensitive adhesive.

DETAILED DESCRIPTION

In the present invention, alkyl acrylates and alkyl methacrylates are employed as a component (a). The alkyl groups may be linear alkyl groups or branched alkyl groups. The alkyl groups include, for instance, alkyl groups having 1 to 14 carbon atoms such as methyl, ethyl, n-butyl, isobutyl, 1-ethylpropyl, 1-methylpentyl, 2-methylpentyl, 3-methylpentyl, 1-ethylbutyl, 2-ethylbutyl, isooctyl, 3,5,5-trimethylhexyl, 2-ethylhexyl, decyl and dodecyl groups.

At most about 50% by weight of the alkyl acrylate and/or alkyl methacrylate may be replaced by other copolymerizable unsaturated monomers. Examples of the replaceable unsaturated monomers are, for instance, a styrene compound such as styrene, α-methylstyrene, vinyltoluene or 2-chlorostyrene; a vinyl ether such as ethyl vinyl ether, isobutyl vinyl ether or 2-ethylhexyl vinyl ether; an acrylic or methacrylic compound having a functional group such as carboxyl group, hydroxyl group, epoxy group, amino group or amido group, e.g. acrylic acid, methacrylic acid, 2-hydroxyethyl acrylate, 2-hydroxyethyl methacrylate, glycidyl acrylate, glycidyl methacrylate, N-methylaminoethyl acrylate, acrylamide or N-methylolacrylamide; an unsaturated monomer having at least two copolymerizable functional groups in one molecule such as polyethylene glycol diacrylate, polyethylene glycol dimethacrylate, polypropylene glycol diacrylate, polypropylene glycol dimethacrylate, trimethylolpropane triacrylate, trimethylolpropane trimethacrylate, oligoester acrylate, methylenebisacrylamide or diallyl phthalate; a vinyl monomer having 2 to 30 carbon atoms such as maleic anhydride, vinyl cinnamate, vinyl pyridine, acrylonitrile, methacrylonitrile, ethylene, propylene, vinyl chloride, vinylidene chloride, vinyl acetate, butadiene or chloroprene. The replaceable unsaturated monomers are not limited to the above exemplified compounds.

Unsaturated organic silicon compounds may be optionally employed as a component (b) in the present invention for introducing silicon functional groups into the produced polymer chains by copolymerization with the component (a). The silicon functional groups of the initiator (c) and the chain transfer agent (d) are introduced into the polymer chain ends, but are not always completely introduced into the all chain ends. Accordingly, the monomer (b) is employed in a small amount in combination with the monomer (a) in accordance with the purposes. Any compounds having at least one carbon-carbon double bond and at least one silicon atom linked to a hydrolyzable group can be employed as a component (b). Representative compounds are those having the general formula (V):

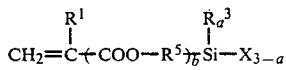
(V)

wherein $R^1$, $R^3$, X and "a" are as defined above, $R^5$ is a bivalent hydrocarbon group having 1 to 18 carbon atoms, preferably methylene, ethylene, butylene, hexylene, phenylene or cyclohexylene group, and "b" is 0 or 1. Alkoxyl groups such as methoxy and ethoxy groups are preferred as a hydrolyzable group X from the viewpoint of easiness in handling.

In the above-mentioned formulas (II), (III), (IV) and (V), typical examples of the monovalent hydrocarbon group $R^3$ are methyl, ethyl, propyl, butyl and phenyl groups. Also, typical examples of the hydrolyzable group X are, for instance, a halogen atom such as fluorine, chlorine, bromine or iodine atom; a group of the general formula: —OZ wherein Z is a group having 1 to 18 carbon atoms selected from the group consisting of an alkenyl group, a saturated or unsaturated hydrocarbon group, a halogenated hydrocarbon group, a hydrocarbon group containing ether bond, an acyl group and N,N-amino group; amino group; a ketoxime group of the general formula: —ON═CR$_2$ wherein R is a monovalent hydrocarbon group having 1 to 12 carbon atoms; a ketoxime group of the general formula: —ON═C═R' wherein R' is a bivalent hydrocarbon group having 1 to 12 carbon atoms; and an amido group of the general formula:

wherein R is as defined above and R" is a hydrocarbon group having 1 to 18 carbon atoms.

Typical examples of the copolymerizable unsaturated organic silicon compound having the general formula (V) used as a component (b) are, for instance, vinyltrimethoxysilane, vinyltriethoxysilane, vinylmethyldimethoxysilane, vinylmethyldiethoxysilane, γ-methacryloyloxypropyltrimethoxysilane, γ-methacyloyloxypropyltriethoxysilane, γ-methacryloyloxypropylmethyldimethoxysilane, γ-methacyloyloxypropylmethyldiethoxysilane, γ-acryloyloxypropyltrimethoxysilane, γ-acryloyloxypropyltriethoxysilane, γ-acryloyloxypropylmethyldimethoxysilane, γ-acryloyloxypropylmethyldiethoxysilane, and the like.

The component (b) is employed in an amount of at most 20 parts by weight, especially 0.01 to 20 parts by weight, per 100 parts by weight of the component (a). Preferably, the component (b) is employed in an amount of not more than 0.05 mole per mole of the component (a). The use of the component (b) is optional. When the amount of the component (b) is more than 20 parts by weight, the increase of elongation is small.

In the present invention, known organic silicon compounds having a silicon functional group may be employed as a chain transfer agent (d) for introducing the silicon functional group into the polymer chain end. Representative organic silicon compounds used as a chain transfer agent (d) are a compound of the general formula (III):

(III)

and a compound of the general formula (IV):

(IV)

wherein $R^3$ is a monovalent hydrocarbon group having 1 to 6 carbon atoms, $R^4$ is bivalent organic group, X is a hydrolyzable group and "a" is 0, 1 or 2. In the above formulas (III) and (IV), preferably the group $R^4$ is a bivalent hydrocarbon group having 1 to 18 carbon atoms, e.g. methylene, ethylene, propylene, butylene, hexylene, phenylene and cyclohexylene groups. Also, alkoxyl groups such as methoxy group and ethoxy group are preferred as a hydrolyzable group X from the viewpoint of easiness in handling. Typical examples of the chain transfer agents shown by the general formulas (III) and (IV) are, for instance, $(CH_3O)_3SiCH_2CH_2CH_2SH$, $[(CH_3O)_3SiCH_2CH_2CH_2S-]_2$,

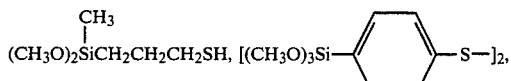

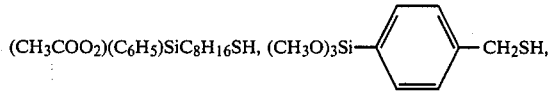

and the like.

The amount of the chain transfer agent (d) is at most 20 parts by weight, especially 0.01 to 20 parts by weight, per 100 parts by weight of the component (a). Preferably, the chain transfer agent (d) is employed in an amount of not more than 0.05 mole per mole of the component (a). When the amount of the chain transfer agent is more than 20 parts by weight, the molecular weight of the produced polymer becomes too small. According to the purposes, the polymerization can be conducted by employing or not employing the chain transfer agent (d), or by employing a usual chain transfer agent having no silicon functional group instead of the chain transfer agent (d) to control the molecular weight, or by employing the chain transfer agent (d) in combination with a usual chain transfer agent having no silicon functional group to control the introduction of the silicon functional group and the molecular weight of the produced polymer.

Azo and peroxide compounds having the silicon functional group of the general formula (II) are employed as a radical polymerization initiator (c) for introducing the silicon functional group into the polymer chain end.

Preferable azo radical polymerization initiators are compounds of the general formula (VI):

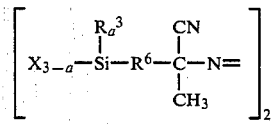

wherein $R^3$, X and "a" are as defined above, and $R^6$ is a bivalent hydrocarbon group having 2 to 18 carbon atoms. In particular, the compounds of the formula (VI) wherein X is an alkoxy group such as methoxy group or ethoxy group, are preferable. Typical examples of such azo initiators are, for instance,

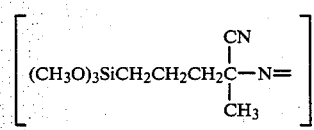

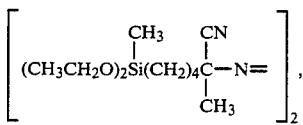

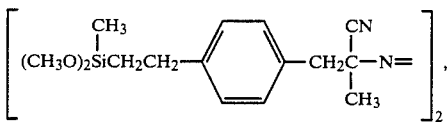

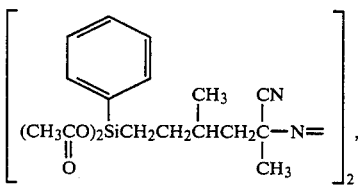

azobis-2-(6-methyldimethoxysilyl-2-cyanohexane),

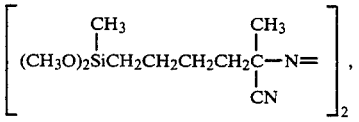

azobis-2-(6-trimethoxysilyl-2-cyanohexane), azobis-2-(6-methyldiacetoxysilyl-2-cyanohexane), and the like. The azo initiators used in the present invention are not limited to the above exemplified compounds.

Typical examples of the peroxide radical polymerization initiators are, for instance,

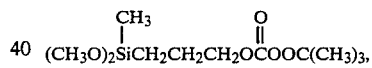

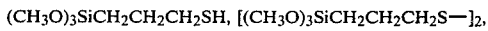

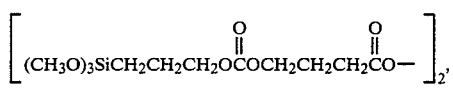

and the like. The peroxide initiators used in the invention are not limited to the above exemplified compounds.

The silicon functional group-containing radical polymerization initiator (c) is employed in an amount of 0.01 to 20 parts by weight per 100 parts by weight of the component (a). The initiator (c) may be employed in combination with usual radical polymerization initiators having no silicon functional group such as azo and peroxide initiators.

Preferably, the average number of silicon functional groups included in one polymer molecule is from 1.2 to 3.5.

The average molecular weight of the polymer of the present invention is from 1,000 to 100,000. In case of applying the polymer to the use as a sealing material, it is preferable to use the polymer having an average molecular weight of 3,000 to 50,000.

The main elementary reactions of the polymerization in the present invention are, for instance, represented as follows:

$$I\cdot + nM \rightarrow I\text{—}M_n\cdot \quad (1)$$

$$2I\text{—}M_n\cdot \rightarrow I\text{—}M_{2n}\text{—}I \quad (2)$$

$$2I\text{—}M_n\cdot \rightarrow I\text{—}M_{n-1}\text{—}M' + I\text{—}M_{n-1}\text{—}M'' \quad (3)$$

$$I\text{—}M_n\cdot + Y\text{—}SH \rightarrow I\text{—}M_n\text{—}H + Y\text{—}S\cdot \quad (4)$$

$$Y\text{—}S\cdot + nM \rightarrow Y\text{—}S\text{—}M_n\cdot \quad (5)$$

wherein I· is a polymerization initiator radical, M is a monomer, I—$M_n$· is a propagating polymer radical in which n monomers have been polymerized by an initiator I, M′ and M″ are a molecular end produced from I—$M_{n-1}$M·, Y is a group of the general formula:

$$-R^4-\underset{\underset{X_{3-a}}{|}}{\overset{\overset{R_a^3}{|}}{Si}}$$

wherein $R^3$, $R^4$, X and "a" are as defined above, Y—S· is a radical produced from a chain transfer agent Y—SH, and Y—S—$M_n$· is a propagating polymer radical in which n monomers have been polymerized.

As shown by the reaction (1), the monomer M is polymerized by the racial I· resulting from the initiator I to produce the propagating polymer radical I—$M_n$·. The propagating polymer radical I—$M_n$· gives a polymer I—$M_{2n}$—I as shown by the reaction (2), or causes a disproportionation reaction to produce I—$M_{n-1}$—M′ and I—$M_{n-1}$—M″ as shown by the reaction (3). Also, as shown by the reaction (4), the propagating polymer radical I—$M_n$· reacts with the chain transfer agent Y—SH to produce a polymer I—$M_n$—H. The radical Y—S· produced at that time reacts with the monomer M in the same manner as the initiator radical I· shown in the reaction (1), to produce Y—S—$M_n$· as shown by the reaction (5). The resulting propagating polymer radical Y—S—$M_n$· causes the recombination reaction in the same manner as the propagating polymer radical I—$M_n$· shown in the reaction (2), or causes the disproportionation reaction as shown in the reaction (3). As understood from the elementary reactions (1) to (5), the silicon functional groups are introduced into the polymer chain ends by the use of the silicon functional group-containing radical polymerization initiator I. Also, when a silicon functional group-containing compound is used as a chain transfer agent, the content of the silicon functional group introduced into the polymer chain ends is increased, since it is possible to cause the reaction (4) in preference to the reaction (3). In particular, when the chain transfer agent of the formula (IV):

$$(X_{3-a}-\underset{\underset{R^4}{|}}{\overset{\overset{R_a^3}{|}}{Si}}-R^4-S-)_2 \quad (IV)$$

wherein $R^3$, $R^4$, X and "a" are as defined above, is used, the content of the terminal silicon functional groups can be further increased, since the silicon functional group is introduced into the both ends of the polymer produced in the reaction (4). In case of the polymerization using an acrylic acid ester as a monomer M, the disproportionation reaction (3) is easy to occur in preference to the recombination reaction (2). Therefore, under certain polymerization conditions, a substantial amount of chain ends having no silicon functional group such as M′ and M″ may be produced. In that case, the polymer having no problem in practical use can be obtained by copolymerizing the monomer M with a small amount of the unsaturated organic silicon compound (b).

The polymerization can be carried out in a usual manner. For instance, the monomer (a) and optionally the monomer (b) are charged at a time before starting the polymerization. Alternatively, a part of the monomer to be used is charged at a time, and the residual monomer is then gradually charged with the progress of the polymerization, for instance, by adding dropwise the monomer to the reaction system. The initiator (c) and the chain transfer agent (d) can also be charged in the same manner as the monomer. For instance, there may be adopted a manner wherein a part of the components (c) and (d) is charged at a time before starting the polymerization, and the residue is dissolved in and charged with the monomer. Preferably, the polymerization is carried out by a bulk polymerization process using no solvent, but can be carried out by a solution polymerization process using a solvent. In case of the solution polymerization, a solvent such as heptane, toluene or isopropanol is employed in an amount of not more than 30 parts by weight per 100 parts by weight of the total of the monomer, the initiator and the chain transfer agent. Also, in case that the hydrolyzable group included in the components (b), (c) and (d) is an alkoxyl group, the polymerization can be conducted by a usual emulsion or suspension polymerization process.

The polymerization is carried out usually for 1 to 20 hours. The polymerization temperature of from 50° to 150° C. is sufficient.

The curable composition of the present invention may contain various additives, as occasion demands.

In case of preparing the curable composition intended for use as a sealing material, there may be incorporated in the composition, plasticizer, filler, reinforcement, antisagging agent, coloring agent, age resister, adhesion accelerator, curing catalyst and modifier for adjusting physical properties.

Examples of the plasticizer which is used, for instance, for adjusting the physical and other properties of the cured product, are a phthalate such as dibutyl phthalate, diheptyl phthalate, di(2-ethylhexyl)phthalate, butylbenzyl phthalate or butylphthalylbutyl glycolate; a non-aromatic dibasic acid ester such as dioctyl adipate or dioctyl sebacate; a polyalkylene glycol ester such as diethylene glycol dibenzoate or triethylene glycol dibenzoate; a phosphoric acid ester such as tricresyl phosphate or tributyl phosphate; a chlorinated paraffin; a hydrocarbon oil such as an alkyl diphenyl or a partially hydrogenated terphenyl, and the like. The plasticizers may be employed alone or in admixture thereof. The use of the plasticizer is not always necessary. Also, the plasticizers may be added at the time of preparing the polymers.

As fillers and reinforcements, there are employed usual fillers and reinforcements, e.g. heavy and light calcium carbonate, calcium carbonate surface-treated with a fatty acid, resin acid or a cationic or anionic surface active agent, magnesium carbonate, talc, titanium dioxide, barium sulfate, alumina, metal powder such as aluminum, zinc or iron, bentonite, kaolin, clay, silica, quartz powder, and carbon black. These fillers and reinforcements may be employed alone or in admixture thereof. In particular, it is possible to obtain a sealing material having an excellent transparency by using a filler or reinforcement capable of providing a transparency such as silica.

Examples of the antisagging agent are, for instance, a hydrogenated castor oil derivative, and a metal soap such as calcium stearate, aluminum stearate or barium stearate. The use of the antisagging agent is not always necessary, and it is used according to the purposes. Also, in case of using a filler or a reinforcement, there is a case where the antisagging agent is not required.

Usual inorganic pigments, organic pigments and dyes can be used in the present invention.

The modifier for adjusting the physical properties is useful, for instance, for raising the hardness of the cured product or for lowering the hardness to provide the cured product with the elongation. Examples of the modifier are, for instance, various silane coupling agents, e.g. an alkylalkoxysilane such as methyltrimethoxysilane, dimethyldimethoxysilane, trimethylmethoxysilane or n-propyltrimethoxysilane, an alkylisopropenoxysilane such as dimethyldiisopropenoxysilane, methyltriisopropenoxysilane or γ-glycidoxypropylmethyldiisopropenoxysilane, an alkoxysilane having a functional group such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(γ-aminoethyl)aminopropylmethyldimethoxysilane, γ-mercaptopropyltrimethoxysilane or γ-mercaptopropylmethyldimethoxysilane; silicone varnishes; and polysiloxanes.

The polymers themselves of the present invention has a good adhesive property to materials such as glasses, ceramics and metals. Also, it is possible to adhere the composition to a wide range of materials with a good adhesive property, when various primers are used. Accordingly, though the use of the adhesion accelerator is not always necessary, the adhesive property of the composition to various kinds of materials can further improved by incorporation of one or more kinds of the adhesion accelerators such as epoxy resins, phenol resins, various silane coupling agents, alkyl titanates and aromatic polyisocyanates.

Examples of the curing catalyst are, for instance, a titanate such as tetrabutyl titanate or tetrapropyl titanate; an organo tin compound such as dibutyl tin dilaurate, dibutyl tin maleate, dibutyl tin diacetate, tin octylate or tin naphthenate; lead octylate; an amine compound such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine or 1,3-diazabicyclo(5,4,6)undecene-7, and a salt thereof with a carboxylic acid; a low molecular polyamide obtained by the reaction of an excess polyamine and a polybasic acid; a reaction product of an excess polyamine and an epoxy compound; a silane coupling agent having amino group, e.g. a known silanol condensation catalyst such as γ-aminopropyltrimethoxysilane or N-(β-aminoethyl)aminopropylmethyldimethoxysilane; and the like. The curing catalysts may be employed alone or in admixture thereof. The amount of the curing catalyst is usually selected from 0.01 to 10 parts by weight per 100 parts by weight of the polymer.

A solvent may be added to the composition of the invention for the purpose of improving the workability or lowering the viscosity, e.g. an aromatic hydrocarbon solvent such as toluene or xylene; an ester solvent such as ethyl acetate, butyl acetate, amyl acetate or an acetic acid ester of ethylene glycol ether; a ketone solvent such as methyl ethyl ketone, methyl isobutyl ketone or diisobutyl ketone. These solvents may also be used at the time of preparing the polymer.

Usual antioxidants and ultraviolet absorbents can be used as age resisters in the invention, though the use thereof is not particularly required.

The curable composition of the invention intended for use as sealing material may be prepared as a one component moisture-curable type. In that case, the composition containing all ingredients is stored in a sealed container. The applied composition hardens by moisture in air. Alternatively, the composition of the invention may be prepared as a two component type. In that case, a hardener composition containing a curing catalyst, a filler, a plasticizer and water is separately prepared, and a polymer composition is admixed with the hardener composition before use.

In case of preparing the one component composition, it is preferable that ingredients containing water are used after dehydrating or drying, or blending of ingredients is conducted while dehydrating by reducing the pressure or other means. In case of a two component curing composition, a trouble of gellation is little even if the additives contain a slight amount of water, since the polymer composition does not contain a curing catalyst. However, when the storage stability for a long term is required, it is desirable to dry the additives to dehydrate. For the dehydration and drying, there are preferably adopted a heat drying method for solid additives such as a powder, and a reduced pressure dehydration method or a dehydration method using synthetic zeolite, activated alumina or silica gel for liquid additives. Water in the composition may also be removed by incorporating a small amount of an isocyanate compound, thereby causing water to react therewith to dehydrate. In addition to the above dehydration and drying methods, it is effective for further improving the storage stability of the composition to add a lower alcohol such as ethanol or methanol, or an alkoxysilane such as n-propyltrimethoxysilane, vinylmethyldimethoxysilane, γ-mercaptopropylmethyldimethoxysilane or γ-glycidoxypropyltrimethoxysilane.

The curable composition intended for use as a pressure sensitive adhesive can also be prepared in the same manner as above. The additives as used for the preparation of a sealing material such as curing catalyst, age resister, plasticizer, reinforcement, modifier for adjusting physical properties and solvent may be used, as occasion demands. In some cases, other known additives used in usual pressure sensitive adhesive compositions may also be added, e.g. phenol resin, xylene resin, cumarone resin, petroleum resin, terpene resin, terpene-phenol resin, and the like. The pressure sensitive adhesive composition of the present invention can be applied to various materials such as tapes, sheets, labels and foils. For instance, the composition of solvent type, emulsion type or hot melt type is coated onto substrates such as synthetic resin or modified natural resin films, papers, all kinds of cloths, metal foils, metallized plastic films, and asbestos or glass fiber cloths, and is exposed to moisture or water to cure at ordinary temperature or with heating.

The uses of the curable composition of the present invention are not limited to a sealing material and a pressure sensitive adhesive, but it can also be employed as a paint, an adhesive, a modifier, a foam material, a water proofing material, a spraying material, a rubber material, and the like.

The present invention is more specifically described and explained by means of the following Examples. It is to be understood that the present invention is not limited to the Examples, and various changes and modifications may be made in the invention without departing from the spirit and scope thereof.

EXAMPLE 1

The ingredients shown in Table 1 were admixed and uniformly dissolved with stirring, and 25 g. of the obtained mixture was placed in a 200 ml. four necked flask equipped with a stirrer and a condenser and replaced with a dry nitrogen gas, and was heated at 80° C. in a nitrogen stream on an oil bath. The polymerization began to start several minutes after and heat generated. After the heat generation became calm, the remaining mixture was gradually added dropwise to the flask through a dropping funnel over 3 hours. The polymerization was finished at the time when no heat generation was observed, to give a polymer composition.

The obtained polymer composition had a viscosity of 490 poises at 20° C. and an average molecular weight of 6,000 measured by gel permeation chromatography. The average number of silicon functional groups included in one polymer molecule (obtained by calculation based on the average molecular weight and the amount of the silicon functional group-containing compounds charged) was 2.4.

To 100 g. of the obtained polymer composition were added 10 g. of dioctyl phthalate, 20 g. of rutile titanium dioxide and 80 g. of calcium carbonate treated with a fatty acid, and mixed by a three roller paint mill to give a paste. After adding 2 g. of dibutyl tin dilaurate and 1 g. of laurylamine to the paste and thoroughly mixing, the paste was poured into a frame having a depth of 3 mm. and cured in a dryer at 23° C. and 55% RH for 7 days and then at 50° C. for 7 days to give a cured sheet.

The obtained cured sheet was punched to give No. 3 dumbbell specimens provided in Japanese Industrial Standard (JIS) K 6301, and the specimens were subjected to a tensile test (rate of tension: 500 mm./minute) using a universal testing machine to measure the elongation at breaking and tensile strength at breaking.

The results are shown in Table 1.

EXAMPLES 2 to 5

The procedures of Example 1 were repeated except that the ingredients shown in Table 1 were employed.

The results are shown in Table 1.

COMPARATIVE EXAMPLE 1

A polymer composition having a viscosity of 520 poises at 20° C. was prepared by conducting polymerization in the same manner as in Example 1 except that the ingredients shown in Table 1 were employed. The average molecular weight and the number of silicon functional groups of the obtained polymer composition were measured.

Also, a cured sheet was prepared in the same manner as in Example 1 except that the above polymer was employed, and the elongation and tensile strength were measured.

The results are shown in Table 1.

COMPARATIVE EXAMPLE 2

A polymer composition having a viscosity of 550 poises at 20° C. was prepared in the same manner as in Example 1 except that the ingredients shown in Table 1 were employed. Also, a cured sheet was prepared by using the above polymer in the same manner as in Example 1, and the elongation and tensile strength were measured.

The results are shown in Table 1.

TABLE 1

| | Ingredients (g.) | | | | | Polymer | | Cured product | |
|---|---|---|---|---|---|---|---|---|---|
| | Acrylate monomer (a) | Comonomer (a) | Unsaturated organic silicon compound monomer (b) | Chain transfer agent (d) | Initiator (c) | Average molecular weight | Number of silicon functional groups per molecule | Elongation (%) | Tensile strength (kg/cm$^2$) |
| Ex. 1 | Butyl acrylate (100) | — | — | MPMDMS (3.6) | Cat-1 (5.1) | 6000 | 2.4 | 520 | 5.5 |
| Ex. 2 | Butyl acrylate (100) | — | MAPTMS (2.5) | MPTMS (3.9) | Cat-2 (2.3) | 7600 | 2.8 | 380 | 6.2 |
| Ex. 3 | 2-Ethylhexyl acrylate (80) | Vinyl acetate (20) | VTES (1.0) | MPTES (2.4) | Cat-3 (4.8) | 8500 | 2.7 | 420 | 5.6 |
| Ex. 4 | Butyl acrylate (80) | Isobutyl vinyl ether (20) | — | DSPTMS (3.9) | Cat-4 (2.7) | 10300 | 2.9 | 580 | 5.4 |
| Ex. 5 | Heptyl acrylate (100) | — | MAPTMS (2.5) | — | Cat-5 (2.8) | 12200 | 2.3 | 510 | 5.3 |
| Com. Ex. 1 | Butyl acrylate (100) | — | MAPMDMS (9.5) | Laurylmercaptan (4) | ABIBN (2) | 5900 | 2.2 | 140 | 4.8 |
| Com. Ex. 2 | Butyl acrylate | — | MAPMDMS (4.4) | MPMDMS (3.6) | ABIBN (2) | 6200 | 2.2 | 250 | 5.0 |

TABLE 1-continued

| Ingredients (g.) | | | | | Polymer | | Cured product | |
|---|---|---|---|---|---|---|---|---|
| Acrylate monomer (a) | Comonomer (a) | Unsaturated organic silicon compound monomer (b) | Chain transfer agent (d) | Initiator (c) | Average molecular weight | Number of silicon functional groups per molecule | Elongation (%) | Tensile strength (kg/cm²) |
| (100) | | | | | | | | |

(Notes)
MAPTMS: γ-methacryloyloxypropyltrimethoxysilane
VTES: vinyltriethoxysilane
MAPMDMS: γ-methacryloyloxypropylmethyldimethoxysilane
MPMDMS: γ-mercaptopropylmethyldimethoxysilane
MPTMS: γ-mercaptopropyltrimethoxysilane
MPTES: γ-mercaptopropyltriethoxysilane
DSPTMS: $(CH_3O)_3SiCH_2CH_2CH_2-S-S-CH_2CH_2CH_2Si(OCH_3)_3$
Cat-1: azobis-2-(6-methyldimethoxysilyl-2-cyanohexane)
Cat-2: azobis-2-(6-trimethoxysilyl-2-cyanohexane)
Cat-3: azobis-2-(6-methyldiethoxysilyl-2-cyanohexane)
Cat-4: azobis-2-(6-methyldiacetoxysilyl-2-cyanohexane)
Cat-5: 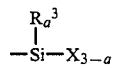
ABIBN: α,α'-azobisisobutyronitrile It is understood from Table 1 that the silicon functional group-containing acrylate polymers of the present invention prepared by using the silicon functional group-containing polymerization initiator (c) with, if necessary, the unsaturated organic silicon compound monomer (b) and/or the silicon functional group-containing chain transfer agent (d) can provide the cured products having an excellent elongation.

EXAMPLE 6

A mixture of 10 g. of the polymer composition obtained in Example 1 and 0.2 g. of dibutyl tin maleate was applied to a polyester film, and cured at 130° C. for 10 minutes to give a pressure sensitive adhesive tape having an adhesive layer of 30 μm. in thickness. The adhesive strength of the tape measured at 20° C. according to JIS C 2107-631 was 380 g./19 mm.

It is understood from the above result that the composition of the present invention is useful as a pressure sensitive adhesive.

In addition to the ingredients used in the Examples, other ingredients can be used in the Examples as set forth in the specification to obtain substantially the same results.

What we claim is:

1. A curable composition comprising a polymer having an organic silicon group in the chain end prepared by polymerizing (a) a monomer comprising an acrylic or methacrylic acid ester of the general formula (I):

$$CH_2=\underset{\underset{R^1}{|}}{C}-COOR^2 \qquad (I)$$

wherein $R^1$ is hydrogen atom or methyl group, and $R^2$ is an alkyl group having 1 to 14 carbon atoms, in the presence of (c) 0.01 to 20 parts of a radical polymerization initiator having a group of the general formula (II):

$$-\underset{\underset{R_a^3}{|}}{Si}-X_{3-a} \qquad (II)$$

wherein $R^3$ is a monovalent hydrocarbon group having 1 to 6 carbon atoms, X is a hydrolyzable group, and "a" is 0, 1 or 2, and at least one member selected from the group consisting of (b) 0.01 to 20 parts of a polymerizable unsaturated organic silicon compound and (d) 0.01 to 20 parts of an organic silicon compound as a chain transfer agent selected from the group consisting of a compound of the general formula (III):

$$HS-R^4-\underset{\underset{R_a^3}{|}}{Si}-X_{3-a} \qquad (III)$$

wherein $R^3$, X and "a" are defined above, and $R^4$ is a bivalent organic group, and a compound of the general formula (IV):

$$(X_{3-a}-\underset{\underset{R_a^3}{|}}{Si}-R^4-S-)_2 \qquad (IV)$$

wherein $R^3$, $R^4$, X and "a" are as defined above; said parts of the components (b), (c) and (d) being parts by weight per 100 parts by weight of the component (a).

2. The composition of claim 1, wherein the monomer (a) is a mixture of the acrylate or methacrylate acid ester and at most 50% by weight of another copolymerizable unsaturated monomer.

3. The composition of claim 1, wherein the polymerizable unsaturated organic silicon compound (b) is a compound of the general formula (V):

$$CH_2=\underset{\underset{R^1}{|}}{C}+COO-R^5\overline{)_b}\underset{\underset{R_a^3}{|}}{Si}-X_{3-a} \qquad (V)$$

wherein $R^1$, $R^3$, X and "a" are as defined above, $R^5$ is a bivalent hydrocarbon group having 1 to 18 carbon atoms, and "b" is 0 or 1.

4. The composition of claim 3, wherein X is an alkoxyl group.

5. The composition of claim 1, wherein said polymer has 1.2 to 3.5 organic silicon groups per one polymer molecule on the average.

6. The composition of claim 1, wherein said polymer has an average molecular weight of 1,000 to 100,000.

7. The composition of claim 1, wherein the hydrolyzable group X in the formula of the compound (II), the compound (III) and the compound (IV) is an alkoxyl group.

8. The composition of claim 2, wherein the other copolymerizable monomer is selected from the group consisting of styrene, α-methylstyrene, vinyltoluene, 2-chlorostyrene, ethyl vinyl ether, isobutyl vinyl ether, 2-ethylhexyl vinyl ether, acrylic acid, methacrylic acid, 2-hydroxyethyl acrylate, 2-hydroxyethyl methacrylate, glycidyl acrylate, glycidyl methacrylate, N-methylaminoethyl acrylate, acrylamide, N-methylolacrylamide, polyethylene glycol diacrylate, polyethene glycol dimethacrylate, polypropylene glycol diacrylate, polypropylene glycol dimethacrylate, trimethylolpropane triacrylate, trimethylolpropane trimethacrylate, oligoester acrylate, methylenebisacrylamide, diallyl phthalate, maleic anhydride, vinyl cinnamate, vinyl pyridine, acrylonitrile, methylacrylonitrile, ethylene, propylene, vinyl chloride, vinylidene chloride, vinyl acetate, butadiene and chloroprene.

9. The composition of claim 1, wherein the monomer (a) is an acrylate acid ester.

10. The composition of claim 1, wherein the polymerizable unsaturated organic silicon compound is selected from the group consisting of vinyltrimethoxysilane, vinyltriethoxysilane, vinylmethyldimethoxysilane, vinylmethyldiethoxysilane, γ-methacryloyloxypropyltrimethoxysilane, γ-methacyloyloxypropyltriethoxysilane, γ-methacryloyloxypropylmethyldimethoxysilane, γ-methacyloyloxyproylmethyldiethoxysilane, γ-acryloyloxypropyltrimethoxysilane, γ-acryloyloxypropyltriethoxysilane, γ-acryloyloxypropylmethyldimethoxysilane and γ-acryloyloxypropylmethyldiethoxysilane.

11. The composition of claim 1, wherein the chain transfer agent (d) is a compound selected from the group consisting of (CH₃O)₃SiCH₂CH₂CH₂SH, [(CH₃O)₃SiCH₂CH₂CH₂S—]₂,

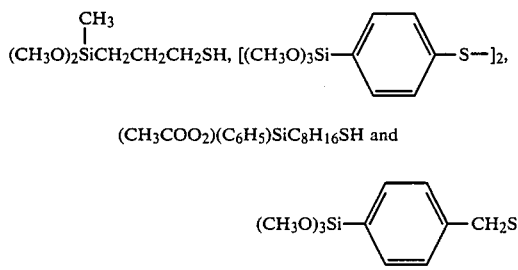

(CH₃COO₂)(C₆H₅)SiC₈H₁₆SH and

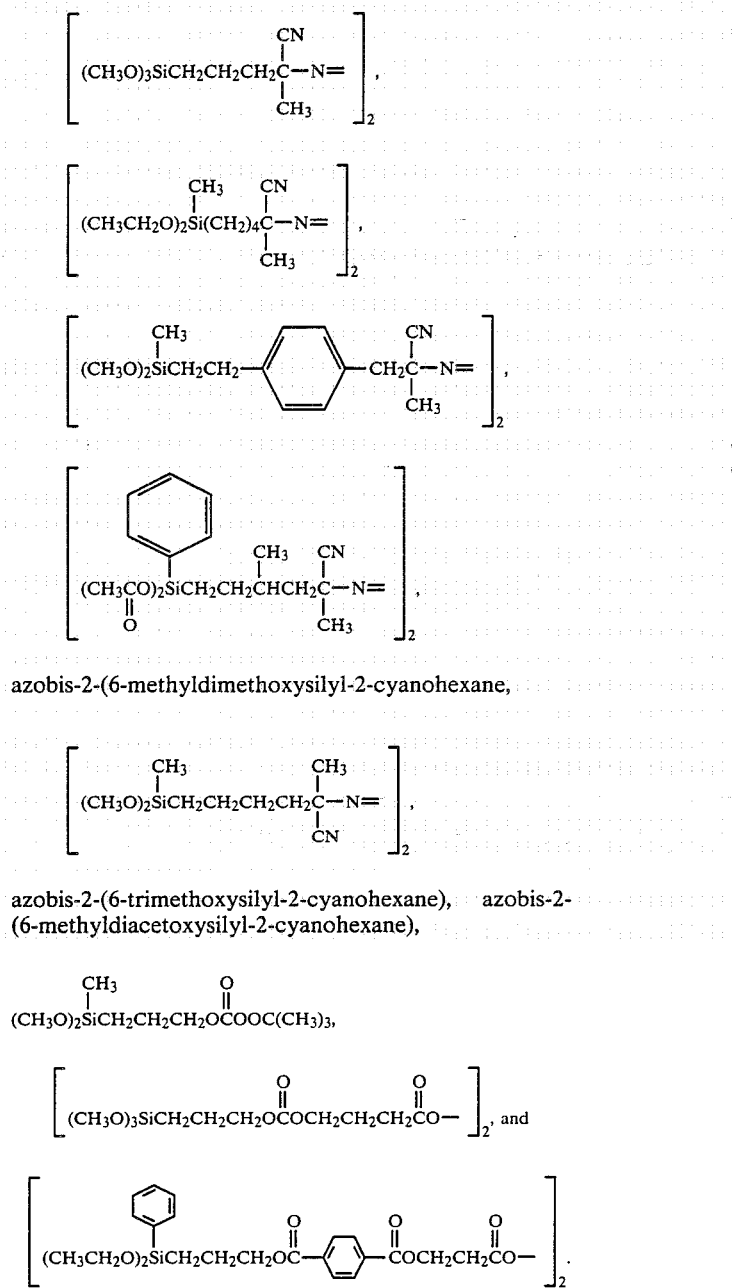

12. The composition of claim 1, wherein said radical polymerization initiator (c) is a member selected from the consisting of azobis-2-(6-methyldimethoxysilyl-2-cyanohexane, azobis-2-(6-trimethoxysilyl-2-cyanohexane), azobis-2-(6-methyldiacetoxysilyl-2-cyanohexane),

* * * * *